Figure 1:
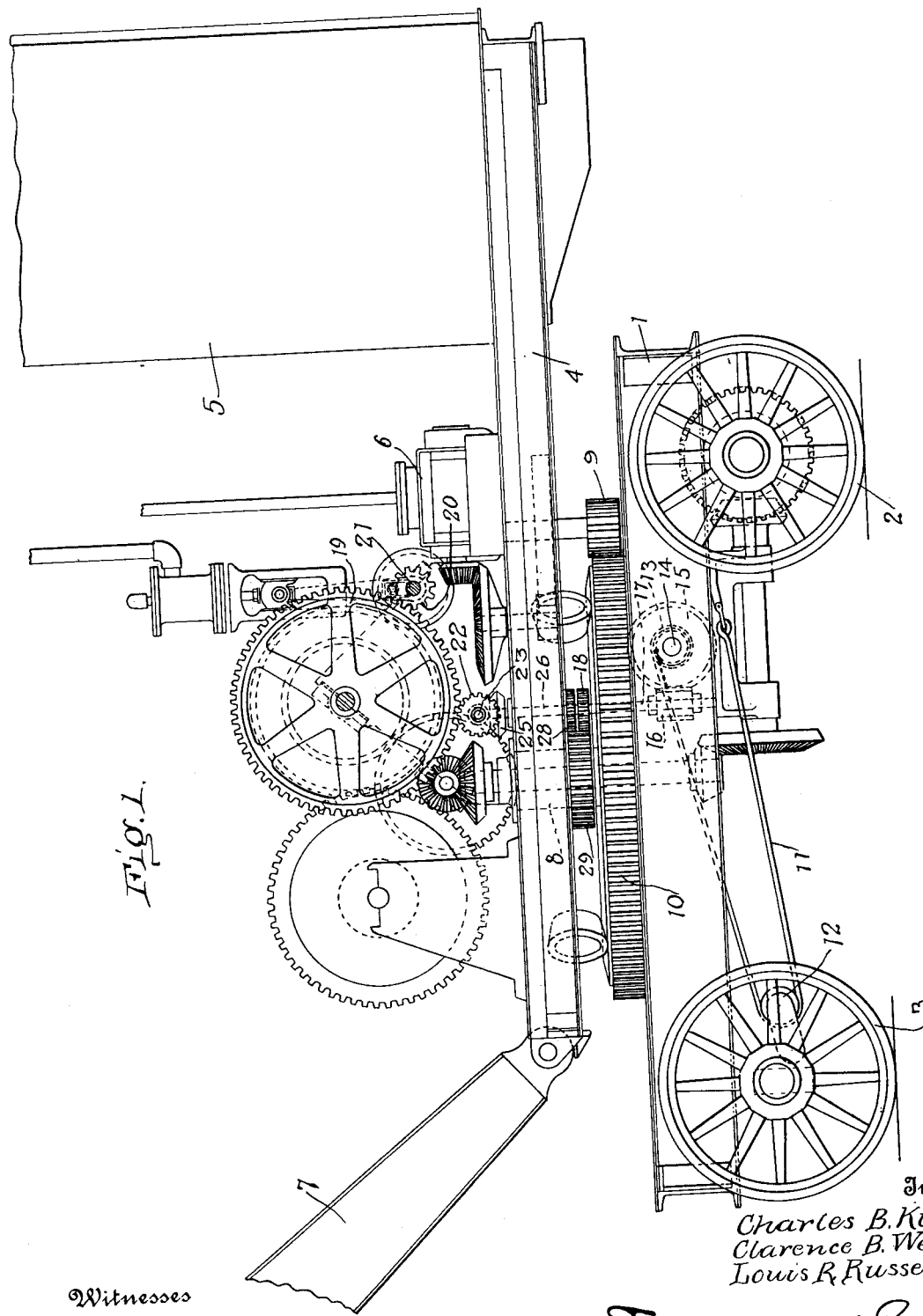

C. B. KING, C. B. WESTON & L. R. RUSSELL.
STEERING MECHANISM FOR EXCAVATING MACHINES.
APPLICATION FILED NOV. 1, 1913.

1,100,080.

Patented June 16, 1914.
2 SHEETS—SHEET 1.

Witnesses
G. H. Walmsley.
H. L. Hammaker.

Inventors
Charles B. King,
Clarence B. Weston,
Louis R. Russell,
By Toulmin & Reed,
Attorneys C. B. KING, C. B. WESTON & L. R. RUSSELL.
STEERING MECHANISM FOR EXCAVATING MACHINES.
APPLICATION FILED NOV. 1, 1913.
1,100,080.
Patented June 16, 1914.
2 SHEETS—SHEET 2.
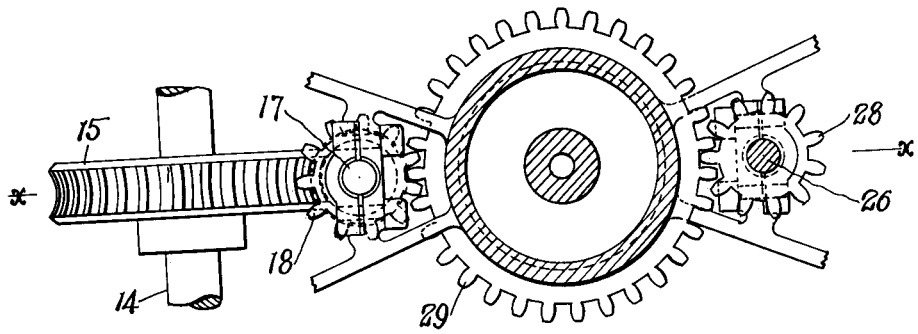
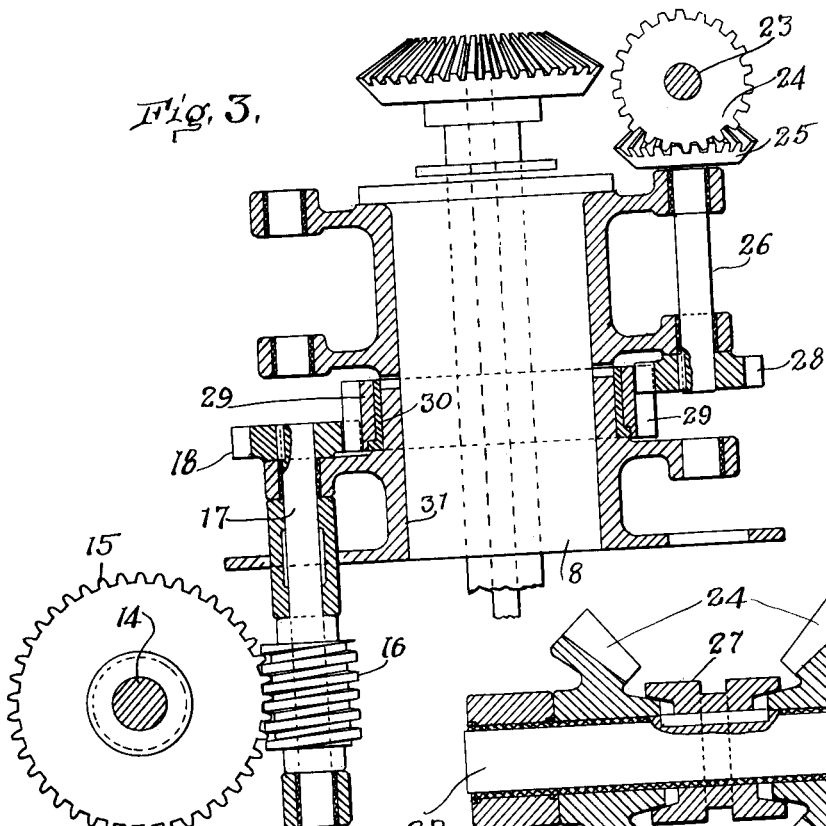
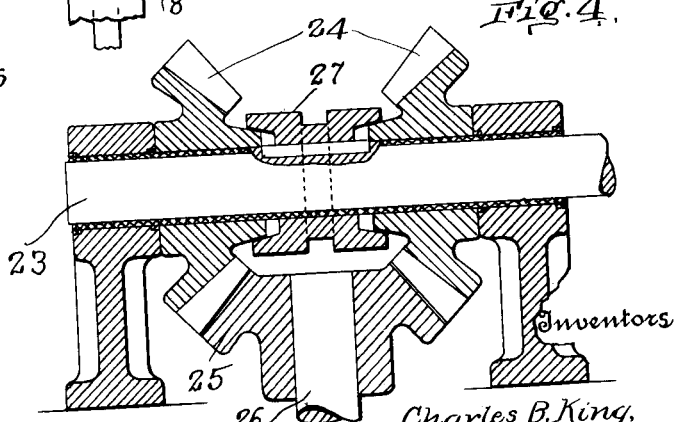

UNITED STATES PATENT OFFICE.

CHARLES B. KING, CLARENCE B. WESTON, AND LOUIS R. RUSSELL, OF MARION, OHIO, ASSIGNORS TO THE MARION STEAM SHOVEL COMPANY, OF MARION, OHIO, A CORPORATION OF OHIO.

STEERING MECHANISM FOR EXCAVATING-MACHINES.

1,100,080.  Specification of Letters Patent.  Patented June 16, 1914.

Application filed November 1, 1913. Serial No. 798,643.

*To all whom it may concern:*

Be it known that we, CHARLES B. KING, CLARENCE B. WESTON, and LOUIS R. RUSSELL, citizens of the United States, residing at Marion, in the county of Marion and State of Ohio, have invented certain new and useful Improvements in Steering Mechanism for Excavating-Machines, of which the following is a specification, reference being had therein to the accompanying drawing.

This invention relates to steering mechanism for excavating machines of the rotary type. Excavating machines of this type comprise a truck having mounted thereon a rotatable platform which carries the power mechanism and the excavating mechanism and is capable of rotation to enable the excavating mechanism to be operated at any point of the circle. Where this type of excavating mechanism is provided with traction wheels or is otherwise designed for use without tracks it is necessary that steering mechanism be provided to control the direction of its travel. The steering is preferably accomplished by power mechanism and where the power mechanism mounted on the platform is utilized for this purpose it is necessary that some connection be established between those parts of the steering mechanism which are on the platform and those parts thereof which are on the truck, which connection will permit of the movement of the platform relatively to the truck. If a clutch mechanism is employed to establish this connection the excavating mechanism must always be brought back to an initial position which will cause the clutch mechanisms to engage one with the other. Such an arrangement is unsatisfactory because it is inconvenient and sometimes impossible, because of obstructions, to return the excavating devices to this initial position. It is also possible to extend the steering connection through a hollow propelling shaft which is mounted on the axis of rotation of the platform, but this hollow shaft forms a very convenient method of connecting the boiler with a source of water supply and for that reason is unavailable for the steering mechanism.

It is, therefore, the object of the present invention to provide means whereby those parts of the steering devices on the rotatable platform will be operatively connected with those parts of the steering devices on the truck at all times regardless of the rotation of the platform.

In the accompanying drawings, Figure 1 is a side elevation, partially broken away, of a rotary shovel embodying our invention; Fig. 2 is a transverse, sectional view, showing the connecting devices; Fig. 3 is a vertical, sectional view taken on the line *x x* of Fig. 2; and Fig. 4 is a sectional, detail view of the clutch mechanism for controlling the operation of the steering devices.

In these drawings, we have illustrated the invention as applied to a steam shovel of the rotary type, which is mounted upon the usual traction wheels, but it will be understood that this form of machine is chosen for the purpose of illustration and that the device is applicable to machines of other kinds.

The mechanism here illustrated comprises a truck consisting of a frame 1, propelling wheels 2 and steering wheels 3. Mounted upon the truck and rotatable about a fixed axis is a platform 4 having mounted thereon the power mechanism, such as a boiler 5 and an engine 6, and the excavating mechanism which consists of a boom and its coöperating devices, a portion only of the boom being shown at 7. This platform is connected to the truck by means of a central pin 8 and rotary movement is imparted to the platform by means of a pinion 9 carried by the platform and meshing with an annular rack 10 secured to the truck frame. The details of this mechanism and its operation being well known will require no further description here. The steering wheels of the truck may be controlled in any suitable manner, that chosen for the purpose of illustration consisting of cables 11, arranged one on each side of the machine, and each connected at one end to a fixed part of the truck, extending about guide pulleys 12 connected with the respective ends of the axle and having their opposite ends connected to drums 13 secured to a shaft 14, said cables being wound about their respective drums in opposite directions, whereby the rotation of the shaft in either direction will cause one drum to wind up its cable and the other drum to unwind its cable, thus imparting a turning movement to the axle carrying the steering wheels. The shaft 14 may be rotated in any suitable manner but as here shown it has mounted thereon a worm wheel 15 meshing with a worm 16 carried by a shaft 17 extending upward above the truck frame and having mounted thereon a pinion 18.

The power for operating the steering mechanism may be secured either from a special engine or from the power driven mechanism. In the present instance we have chosen to actuate the steering devices from the driving gear 19 for the hoisting drum, which gear meshes with a pinion 20 on an engine shaft 21.

The driving gear 19 meshes with a pinion 22 on a shaft 23, which shaft constitutes the main driving shaft for the steering devices and has loosely mounted thereon two bevel pinions 24 each permanently in mesh with a bevel pinion 25 carried by a vertical shaft 26. A clutch 27 is slidably mounted upon the shaft 23 and is adapted to engage either pinion and connect the same to the shaft, in a well known manner, thus enabling the shaft and consequently the steering devices to be rotated in either direction. The shaft 26 has at its lower end a gear 28 similar to the gear 18 and arranged in a plane slightly higher than the plane of the gear 18. To provide an operative connection between the gears 28 and 18 whereby they will be caused to move in unison regardless of the rotation of the platform 4 they are both caused to mesh with a gear 29 mounted to rotate about the axis of rotation of the pin 8. The gear 29 is loosely supported and constitutes merely an intermediate gear between the gears 28 and 18 and it will be apparent that upon the rotation of the gear 18 the gear 29 will be rotated and impart similar movement to the gear 18 and it will be further apparent that this rotation will be in nowise affected by the movement of the gear 28 about the axis of rotation of the platform 4. The character of the gear 29 and the manner of mounting the same may be varied but in the present instance we have shown it in the form of a shell gear or ring loosely mounted upon a bearing collar 30 extending about and supported by a cylindrical casing 31 carried by the truck and through which the connecting pin 8 extends.

The operation of the mechanism has been fully explained in connection with the construction thereof and it will be apparent that we have provided a very simple and a very efficient steering mechanism, the parts of which are at all times in operative engagement regardless of the rotary movement of the platform.

While we have shown and described one embodiment of our invention it will be understood that this has been chosen for the purpose of illustration only and that we do not desire to be limited to the details of construction shown and described, for obvious modifications will occur to a person skilled in the art.

Having thus fully described our invention, what we claim as new and desire to secure by Letters Patent, is:—

1. The combination, with a truck having steering wheels, and a platform rotatably mounted on said truck, of coöperating steering devices carried by said truck and said platform, respectively, and operable independently of the rotation of said platform, and means to maintain an operative connection between said steering devices when rotary movement is imparted to said platform.

2. The combination, with a truck having steering wheels, and a platform rotatably mounted on said truck, of coöperating steering devices carried by said truck and said platform, respectively, and each comprising a gear, and a third gear rotatable about the axis of rotation of said platform and meshing with both of the first-mentioned gears.

3. The combination, with a truck having steering wheels, steering devices carried by said truck and operatively connected with said wheels, said steering devices comprising a vertical shaft, and a gear secured thereto, of a platform rotatably mounted on said truck, on a vertical axis, power mechanism carried by said truck, steering devices carried by said platform, connected with said power mechanism and comprising a vertical shaft and a gear secured thereto, said gear being arranged in a plane above the plane of the first-mentioned gear, and a gear rotatable about the axis of rotation of said platform and meshing with the gears of both parts of said steering mechanism.

4. The combination, with a truck having steering wheels, a platform supported above said truck, and a pin rotatably connecting said platform to said truck, of coöperating steering devices carried by said truck and said platform, respectively, and a connecting device supported by said pin and operatively connected with both of said steering devices, whereby movement imparted to one of said steering devices will be transmitted through said connecting device to the other steering device.

5. The combination, with a truck having steering wheels, a platform supported above said truck, and a pin rotatably connecting said platform to said truck, of coöperating steering devices carried by said truck and said platform, respectively, and each comprising a gear, and an annular gear extending about said pin and rotatable about the axis thereof and meshing with the gears of both of said steering devices.

6. The combination, with a truck comprising steering wheels, a platform supported above said truck, a casing carried by one of said members, a pin extending through said casing and rotatably connecting said platform to said truck, of an annular gear extending about and rotatably mounted on said casing, and coöperating steering devices carried by said truck and said platform, respectively, each of said devices comprising a gear meshing with said annular gear.

In testimony whereof, we affix our signatures in presence of two witnesses.

CHARLES B. KING.
CLARENCE B. WESTON.
LOUIS R. RUSSELL.

Witnesses:
ALBERT W. GRACELY,
D. L. CULP.